(12) United States Patent
Chen

(10) Patent No.: US 11,329,519 B2
(45) Date of Patent: May 10, 2022

(54) INDUCTIVE POWER TRANSMITTER

(71) Applicant: Apple Inc., Cupertino, CA (US)

(72) Inventor: Liang Chen, Auckland (NZ)

(73) Assignee: Apple Inc., Cupertino, CA (US)

(*) Notice: Subject to any disclaimer, the term of this patent is extended or adjusted under 35 U.S.C. 154(b) by 84 days.

(21) Appl. No.: 15/562,608

(22) PCT Filed: Apr. 1, 2016

(86) PCT No.: PCT/NZ2016/050055
§ 371 (c)(1),
(2) Date: Sep. 28, 2017

(87) PCT Pub. No.: WO2016/159788
PCT Pub. Date: Oct. 6, 2016

(65) Prior Publication Data
US 2018/0109152 A1    Apr. 19, 2018

Related U.S. Application Data

(60) Provisional application No. 62/142,023, filed on Apr. 2, 2015.

(51) Int. Cl.
*H02J 50/60* (2016.01)
*H02J 50/12* (2016.01)
*H02J 7/02* (2016.01)

(52) U.S. Cl.
CPC ............. *H02J 50/60* (2016.02); *H02J 7/025* (2013.01); *H02J 50/12* (2016.02)

(58) Field of Classification Search
CPC ................................. H02J 50/12; H02J 50/60
See application file for complete search history.

(56) References Cited

U.S. PATENT DOCUMENTS

| | | |
|---|---|---|
| 4,960,983 A | 10/1990 | Inoue |
| 6,219,267 B1 | 4/2001 | Andres |
| 2005/0068019 A1 | 3/2005 | Nakamara et al. |
| 2007/0131505 A1 | 6/2007 | Kim |
| 2007/0228833 A1 | 10/2007 | Stevens et al. |
| 2009/0174264 A1 | 7/2009 | Onishi et al. |
| 2011/0089768 A1 | 4/2011 | Byrne et al. |
| 2011/0196544 A1 | 8/2011 | Baarman et al. |

(Continued)

FOREIGN PATENT DOCUMENTS

| | | |
|---|---|---|
| CN | 1954472 A | 4/2007 |
| CN | 103782485 A | 5/2014 |

(Continued)

OTHER PUBLICATIONS

International Search Report for International Application No. PCT/NZ2016/050055 dated Jun. 28, 2016 (4 pages).

(Continued)

*Primary Examiner* — Daniel Kessie
(74) *Attorney, Agent, or Firm* — Fletcher Yoder PC

(57) ABSTRACT

An inductive power transmitter 2 comprising: at least one power transmitting coil 7 configured to generate an inductive power transfer (IPT) field, and an object detection (OD) system 200 configured to detect the presence of an object based on a change in energy decay or change in resonant frequency of a resonant circuit integrated with or coupled to the transmitting coil.

17 Claims, 13 Drawing Sheets

(56) References Cited

U.S. PATENT DOCUMENTS

| | | | |
|---|---|---|---|
| 2013/0030892 A1 | 1/2013 | Liu et al. | |
| 2013/0119773 A1 | 5/2013 | Davis | |
| 2013/0127259 A1* | 5/2013 | Lohr | H02J 5/005 |
| | | | 307/104 |
| 2013/0176023 A1 | 7/2013 | Komiyama | |
| 2014/0015329 A1 | 1/2014 | Widmer et al. | |
| 2014/0009178 A1 | 4/2014 | Hyodo | |
| 2014/0091634 A1 | 4/2014 | Mayo et al. | |
| 2014/0091755 A1 | 4/2014 | Walley et al. | |
| 2014/0191715 A1 | 7/2014 | Wechlin et al. | |
| 2014/0197687 A1 | 7/2014 | Lin | |
| 2014/0252875 A1* | 9/2014 | Lee | H02J 50/90 |
| | | | 307/104 |
| 2015/0285926 A1* | 10/2015 | Oettinger | H02J 50/70 |
| | | | 307/104 |
| 2017/0117756 A1* | 4/2017 | Muratov | H02J 7/025 |

FOREIGN PATENT DOCUMENTS

| | | |
|---|---|---|
| EP | 2017940 A2 | 1/2009 |
| EP | 2602908 A1 | 6/2013 |
| EP | 3127215 A1 | 2/2017 |
| JP | H01157896 A | 6/1989 |
| JP | 2003263668 A | 9/2003 |
| JP | 2005345435 A | 12/2005 |
| JP | 2009112137 A | 5/2009 |
| JP | 2009118587 A | 5/2009 |
| JP | 2010239690 A | 10/2010 |
| JP | 2010538596 A | 12/2010 |
| JP | 2011193671 A | 9/2011 |
| JP | 2012175793 A | 9/2012 |
| JP | 2012533277 A | 12/2012 |
| JP | 2013542424 A | 11/2013 |
| JP | 2014027102 A | 2/2014 |
| JP | 2014126512 A | 7/2014 |
| JP | 2014204630 A | 10/2014 |
| JP | 2014526871 A | 10/2014 |
| JP | 2014222994 A | 11/2014 |
| JP | 2015046990 A | 3/2015 |
| JP | 2015136281 A | 7/2015 |
| KR | 10-20080094953 A | 10/2008 |
| WO | 8910030 A1 | 10/1989 |
| WO | 2005109598 A1 | 11/2005 |
| WO | 2008137996 A1 | 11/2008 |
| WO | 2009027674 A1 | 3/2009 |
| WO | 2009041058 A1 | 4/2009 |
| WO | 2013122483 A1 | 8/2013 |
| WO | 2013164831 A1 | 11/2013 |
| WO | 2013179394 A | 12/2013 |
| WO | 2014011776 A2 | 1/2014 |
| WO | 2014060871 A1 | 4/2014 |
| WO | 2014083015 A1 | 6/2014 |
| WO | 2014095722 | 6/2014 |
| WO | 2014095722 A2 | 6/2014 |
| WO | 2015015690 A1 | 2/2015 |

OTHER PUBLICATIONS

International Written Opinion for International Application No. PCT/NZ2016/050055 dated Jun. 28, 2016 (5 pages).

* cited by examiner

INDUCTIVE POWER TRANSMITTER

This application is a National Stage Application of PCT/NZ2016/050055, filed 1 Apr. 2016, which claims benefit of U.S. Ser. No. 62/142,023, filed 2 Apr. 2015 and which applications are incorporated herein by reference. To the extent appropriate, a claim of priority is made to each of the above disclosed applications.

FIELD

The invention generally relates to an inductive power transmitter for inductive power transfer (IPT) and in particular foreign object detection.

BACKGROUND

IPT is a well-known area of established technology used in many applications including wireless charging of portable electric devices. A charging mat is one way of providing a charging surface for a portable device and has an interface surface incorporating a power transmitter with one or more transmitting coils that generate a time-varying magnetic field. The magnetic field induces an alternating current in a suitable receiving coil of a power receiver that can then be used to charge a battery, or power a device or other load.

It is particularly important that IPT systems for wireless power transmitter transfers power to power receiver only and not to so-called 'foreign objects'. Foreign objects are defined as any object that is positioned on a charging mat but are not part of a receiver device. Typical examples of such foreign objects are metallic elements such as coins, keys, paperclips, etc. For example, if a metal object is close to the active IPT field it could be heated due to eddy currents being developed from the oscillating magnetic field. In order to prevent the temperature of such parasitic metal from rising to unacceptable levels, the power transmitter should be able to discriminate between power receivers and foreign objects and reduce the power being transferred or abort operation altogether.

One method in the art for detecting foreign objects is known as a power loss method. In this method, the received power is indicative of the total amount of power dissipated within a power receiver contained in a handheld device due to the magnetic field produced by the power transmitter. The received power equals the power that is available from the output of the power receiver plus any power that is lost in producing that output power. The power receiver communicates its received power back to the power transmitter so that the power transmitter is able to determine whether the power loss is within acceptable set limits, and if not, the power transmitter determines anomalous behaviour indicative of the presence of a foreign object. However, power loss accounting does not in itself provide actual detection of a foreign object, only the occurrence of non-expected behaviour. Further, the transmitter and receiver must be preconfigured to communicate with one another thereby limiting the versatility of the devices and the accuracy varies widely depending on the distance between the transmitter and the receiver.

Another method in the art is described in international patent publication number WO2014/095722 where foreign objects are detected by separate excitation and detection coils within the transmitter. The method describes detecting changes in the output voltage in the detection coil, or changes in the inductance of the detection coil to determine the presence of a foreign object. However, this method requires complex calibration to determine the base inductance characteristics. This method is also unable to distinguish between metal objects ferrous or magnetic objects and therefore does not provide a means to discriminate between foreign objects and friendly objects such as a receiver device. Any undesirable effects of operation of the primary IPT field on the detection are also not considered or characterised, this method is therefore unreliable.

Another method in the art is described in US patent application 20130176023 where foreign objects are detected by actively monitoring the quality factor or Q value of a receiver coil by measuring changes in voltage across as inductor. Foreign objects are detected by actively generating a resonating voltage in a receiver or detection coil and then detecting the Q value changes via the transmitter coil. However, this method incorporates losses from both the transmitter and receiver coil and therefore lends to inaccuracies as losses caused by the receiver are indistinguishable from losses caused by other components in the system such as foreign objects. Further, separate circuits on the receiver and transmitter are required to provide this functionality, lending toward increased manufacturing cost and physical size requirements.

The present invention may provide an improved inductive power transmitter or may at least provide the public with a useful choice.

SUMMARY

According to one example embodiment there is provided an inductive power transmitter comprising
  at least one power transmitting coil configured to generate an inductive power transfer (IPT) field, and
  an object detection (OD) system configured to detect the presence of an object based on a change in energy decay or change in resonant frequency of a resonant circuit integrated with or coupled to the transmitting coil.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1A:
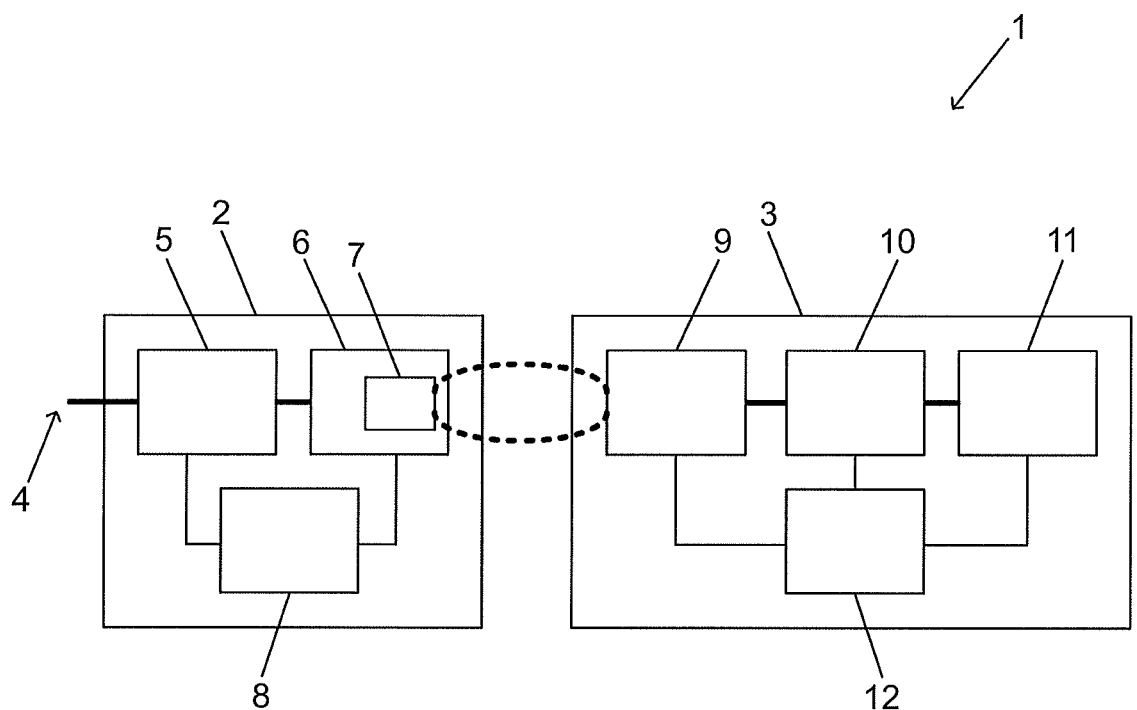
FIG. 1a is a schematic of an inductive power transfer system.

An inductive power transfer (IPT) system 1 is shown generally in FIG. 1a. The IPT system typically comprises an inductive power transmitter 2 and an inductive power receiver 3. The inductive power transmitter 2 is connected to an appropriate power supply 4 such as mains power or a battery. The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the IPT transmitter 2. The controller 8 may be adapted to receive inputs from each part of the IPT transmitter 2 and produce outputs that control the operation of each part. The controller 8 may be implemented as a single unit or separate units, configured to control various aspects of the IPT transmitter 2 depending on its capabilities, including for example: foreign object detection, power flow, tuning, selectively energising transmitting coils, inductive power receiver detection and/or communications. The controller 8 may have one or more units/components, and may be a controller such as a microcontroller, PID, FPGA, CPLD, ASIC, etc. Further, it may be possible to integrate significant parts of the entire wireless receiver circuit onto a single integrated circuit.

The inductive power receiver 3 includes a receiving coil or coils 9 connected to receiver circuitry which may include power conditioning circuitry 10 that in turn supplies power to a load 11. When the coils of the IPT transmitter 2 and the inductive power receiver 3 are suitably coupled, the alternating magnetic field generated by the transmitting coil or coils 7 induces an alternating current in the receiving coil or coils 9. The power conditioning circuitry 10 is configured to convert the induced current into a form that is appropriate for the load 11, and may include for example a power rectifier, a power regulation circuit, or a combination of both. The receiving coil or coils 9 may be connected to capacitors (not shown) either in parallel or series to create a resonant circuit. In some inductive power receivers, the receiver may include a controller 12 which may control tuning of the receiving coil or coils 9, operation of the power conditioning circuitry 10 and/or communications.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. The use of the term "coil" in either singular or plural is not meant to be restrictive in this sense. Other configurations may be used depending on the application.

It may be desirable in certain applications for the IPT transmitter to selectively provide power to associated receiver devices (e.g., mobile phones, remote controls, etc.) and not to foreign objects (FO) (e.g., paperclips, coins, etc.). To this end, the IPT transmitter may include an Object Detection (OD) system. The OD system may either deactivate coils in response to non-receiver devices or only activate coils in the sole presence of receiver devices. In situations where there is a plurality of transmitting coils, such as an array of coils (e.g., on a charging mat), the OD system may only de/activate, a subset of coil/s according to the location of the receiver/non-receiver device respectively.

In general terms this embodiment may include charging a coil with an initial known energy, removing the energisation and then comparing the decay performance against known characteristics for foreign objects or non-receiver devices, receiver devices and/or no devices.

Figure 1B:
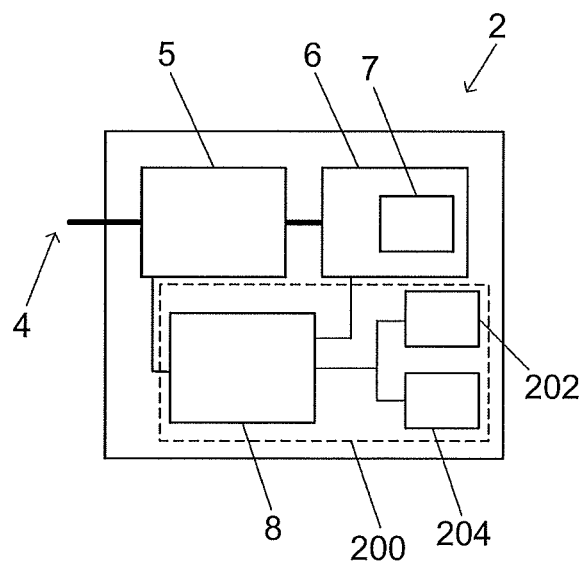
FIG. 1b is a block diagram of an object detection system.

An example transmitter 2 is shown in FIG. 1b. The inverter 6 supplies power to the transmitting coil 7 to generate an IPT field. An OD circuit 200 includes an excitation coil or coils 202 to generate a OD field and/or an initial detection energy and a detection circuit 204 used to sense the presence and/or location of objects on or adjacent to the transmitter 2. The controller 8 of the transmitter 2 may either directly or via a separate control circuit be configured to determine the excitation to be provided to the excitation coil 202 and process the output signal from the OD circuit 204.

This may involve an array of coils, and/or or a plurality of OD circuits (and either using the IPT frequency or modulating an excitation signal onto the IPT field) depending on the requirements of the application.

The OD field may be generated by the transmitting coil 7 or may be a separate coil, coupled or otherwise. It may be operated sequentially with the IPT field or simultaneously. If it is operated simultaneously it may be desirable to operate the OD field at a different frequency. The advantage of operating at a different frequency to the IPT frequency is that receiver devices will effectively appear invisible (as they are tuned to only receive power at the resonant IPT frequency). This may allow the system to be designed to be more sensitive to the introduction of a FO even in the overlapping presence of a receiver object.

For example, the OD field may operate a 5-50 kHZ and the IPT field may operate at 50 kHz-500 kHz. The OD field and can be tuned to a frequency higher or lower than the IPT field. To ensure the best operation performance in the presence of a receiver object, the OD field may be tuned to a frequency at least five times away from it. For example, for an IPT frequency of 100 kHz the OD frequency can be tuned to 20 kHz or less, or for an IPT frequency of 200 kHz the OD frequency can be tuned to at least 1 Mhz. Further it may be desirable that the IPT frequency is not a harmonic of the OD frequency or vice versa, to avoid and harmonic resonances in receiver devices (and therefore resulting receiver losses from the OD field). For example, if the IPT transmitter is configured to operate at 100 kHz the OD coil may be configured to operate at 10.5 kHz or some offset.

The IPT transmitter 2 comprises a capacitor selectively coupled to the transmitting coil(s) 7 for form a high Q resonant tank. The Q-value is an index indicating the degree of resonance of a resonant circuit at a resonant frequency. A high Q resonant tank circuit sustains an oscillation longer than lower Q circuit. Since it is the envelope of the oscillations that determines the rate of decay, more oscillation (higher Q) means easier and more accurate detection. Additionally, the measured decay rate or power loss is influenced by both the ESR of the coil (Q) and losses due to FOs, higher Q (lower ESR) therefore means a smaller and more accurate FO loss can be measured. For example, it is more difficult to accurately determine an additional FO loss of 250 mW on top of a 2 W coil ESR loss than the same FO loss on top of a 250 mW coil ESR loss.

Figure 2:
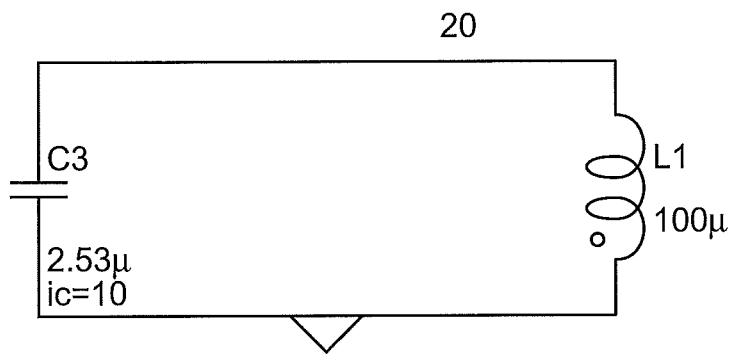
FIG. 2 is a schematic diagram of a resonant tank in an inductive power transfer system.

FIG. 2 shows of a resonant circuit tank circuit 20 comprising a capacitor C3 and inductor coil L1. This may be energised by inverter 6 at a desired frequency and magnitude to generate a desired initial energy level. The decay of the energy level after the inverter 6 is disconnected is then measured. If energy is wirelessly coupled to the resonant tank, the frequency used affects how much energy couples into the resonant tank as more energy is coupled if frequency is similar to the resonant frequency.

A larger initial energy causes a larger current to flow which induces a larger power loss in the FO. Similarly, a distant FO will generate a smaller power loss and be increasingly undetectable the further it is from the transmitter. Therefore the level of initial energy provided to the resonant circuit could be selected on whether a FO is within effective range of the IPT transmitter, or on a minimum detection distance.

Further, as a receiver gets closer its induced loss becomes increasingly larger (even though the FO frequency is not tuned to the Rx resonant frequency). At some point these two losses will cross over and then it will be impossible to tell them apart. Therefore it is important to energize the resonant coil at the appropriate amount of energy to capture the FO induced loss but not receiver induced loss.

Figure 3:
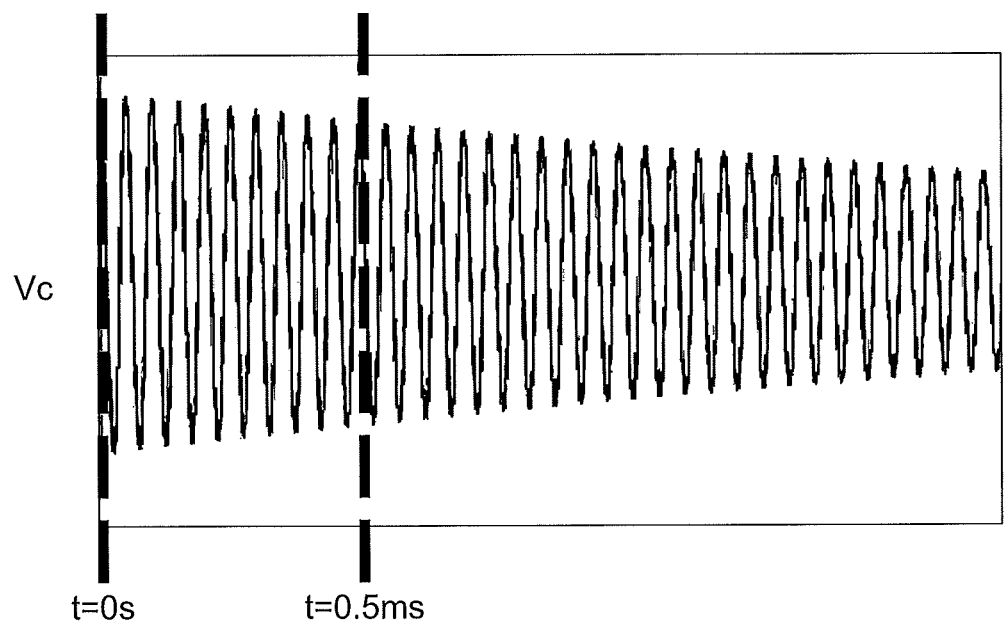
FIG. 3 is a graph of energy decay in the resonant tank of FIG. 2.

FIG. 3 shows a graph of energy decay in the resonant tank of FIG. 2. The tank is energised before t=0 and at t=0 energisation is stopped to produce a known energy trapped in the tank of $E=1/2*C*V^2$. The voltage across the capacitor C1 is measured after a time period that allows for measureable energy decay to occur. In some embodiments, the period is 0.5 milliseconds, however the particular time period should be selected to account for a portion of according to generally expected decay times. The difference in energy before and after the decay time is power loss due to natural loss due to coil and capacitor resistance and any loss created by foreign objects in the inductive field. Knowledge of the energy loss for an unobstructed field, and a field whereby an inductive power receiver is present, can then be compared to any new field measurements to enable a determination of whether a foreign object is present in the field.

Measurement of the capacitor voltage is ideally performed by envelope detection or similar methods for peaks of the waveform, such as measurement of the peak voltage of each cycle. The energy can determined from the measured voltage using $$E = \frac{1}{2}CV^2,$$

where C is known beforehand. The capacitance value is not affected by the presence of ferrites or reflected impedances. The peak terminal voltage is therefore a direct measurement of the energy in the tank.

Figure 4A:
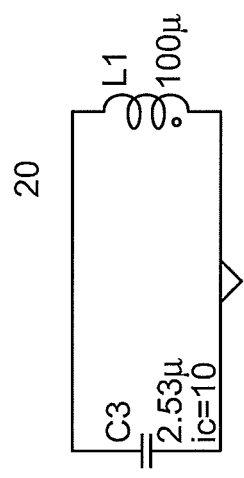
FIG. 4(a) is circuit diagram of a resonant tank circuit.
Figure 4B:
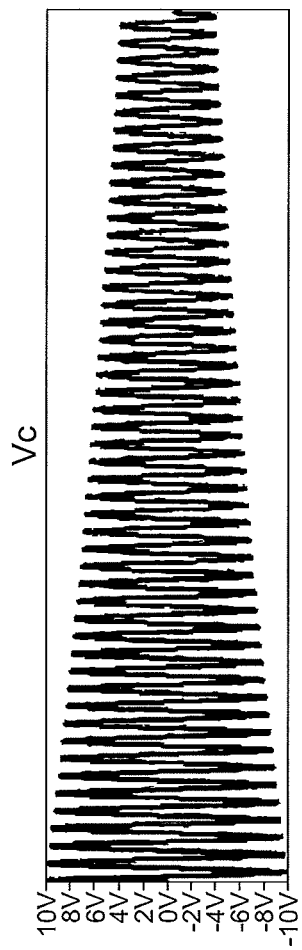
FIG. 4(b) is a graph of energy decay in the circuit of FIG. 4(a) as a function of time.

FIGS. 4 to 6 show example energy decay data for three scenarios. In particular, FIG. 4(a) shows a resonant tank circuit 20 configured to resonate at 10 kHz and FIG. 4(b) shows graph of corresponding energy in the circuit as a function of time. The rate of energy decay is indicative of no foreign objects being present in the field.

Figure 5A:
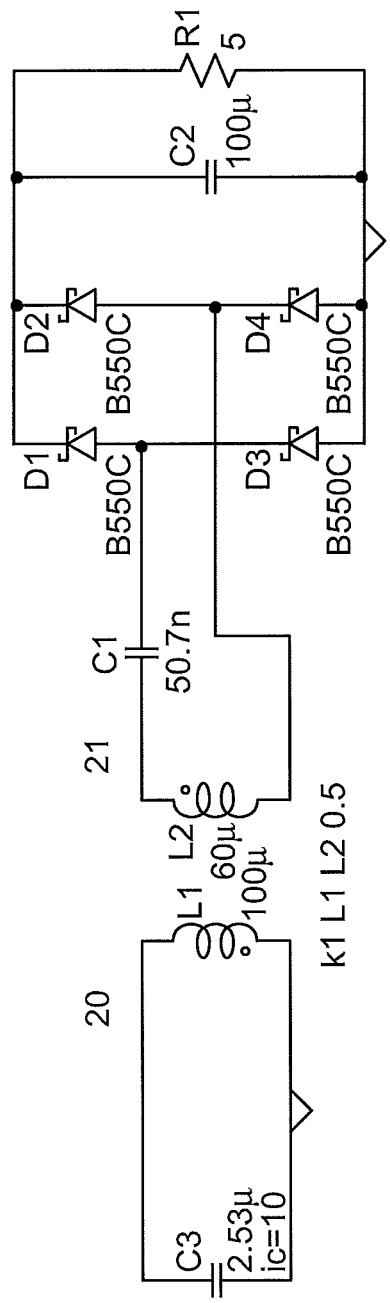
FIG. 5(a) is circuit diagram of a resonant tank circuit and a proximate inductive power receiver.
Figure 5B:
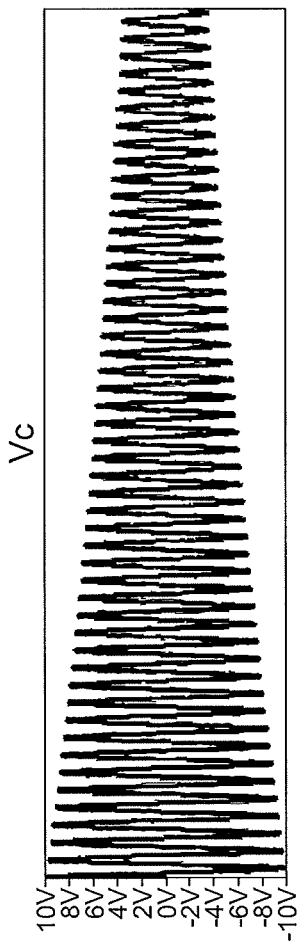
FIG. 5(b) is a graph of energy decay in the circuit of FIG. 4(a) as a function of time.

FIG. 5(a) shows a resonant tank circuit 20 with an IPT receiver circuit 21 having receiver coil L2 positioned in proximity to the transmitter coil L1. FIG. 5(b) shows graph of the corresponding energy in the resonant tank circuit as a function of time and in particular shows a largely similar rate of energy decay compared to the unobstructed field of FIG. 4.

Figure 6A:
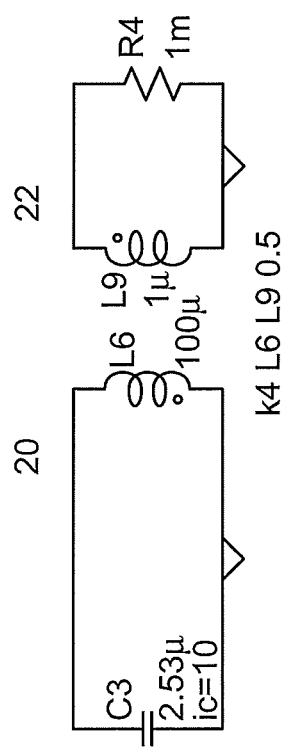
FIG. 6(a) is circuit diagram of a resonant tank circuit and a model of a proximate foreign object.
Figure 6B:
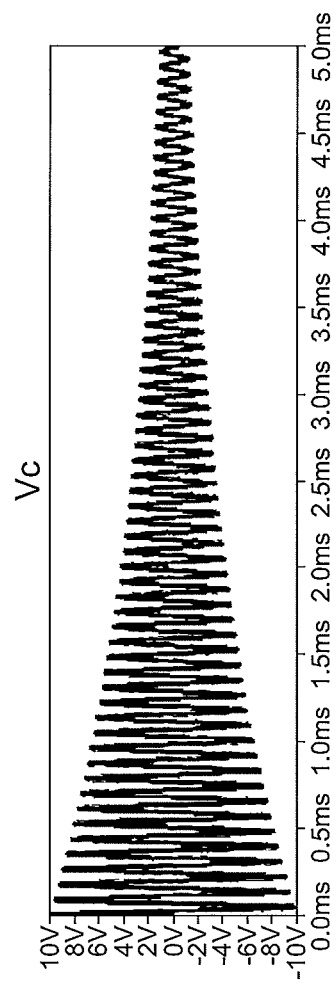
FIG. 6(b) is a graph of the corresponding energy in the resonant tank circuit as a function of time.

FIG. 6(a) shows a resonant tank circuit 20 with a circuit model of a metallic foreign object 22 having equivalent inductance L9 and resistance R4 in the proximity of the transmitter coil. FIG. 6(b) shows a graph of the corresponding energy in the resonant tank circuit as a function of time and in particular shows a rapid rate of decay compared to the decay rates of FIGS. 4(b) and 5(b) due to the increased losses.

The rate of decay, or similarly, the energy remaining in the resonant tank after a time period is indicative of the nature of objects in proximity to the transmitter coil. The nature of objects in proximity to the transmitter coil is therefore able to be determined by comparison of the energy remaining in the resonant tank after a time period is with one or more energy thresholds or energy ranges.

Foreign object detection may therefore possible without the presence of an inductive power receiver present in the generated field. The accuracy of detection may be improved by mitigating or avoiding energy losses due to the presence of a receiver that a detection system in the transmitter would otherwise be exposed to. A further advantage may be that communication between the power transmitter and power receiver is not required.

In some embodiments, the transmitter comprises a coil configured for inductive power transmission and also for generation of an OD field. In alternative embodiments, the transmitter comprises a coil for inductive power transmission and a separate coil for generation of the OD field.

Figure 7:
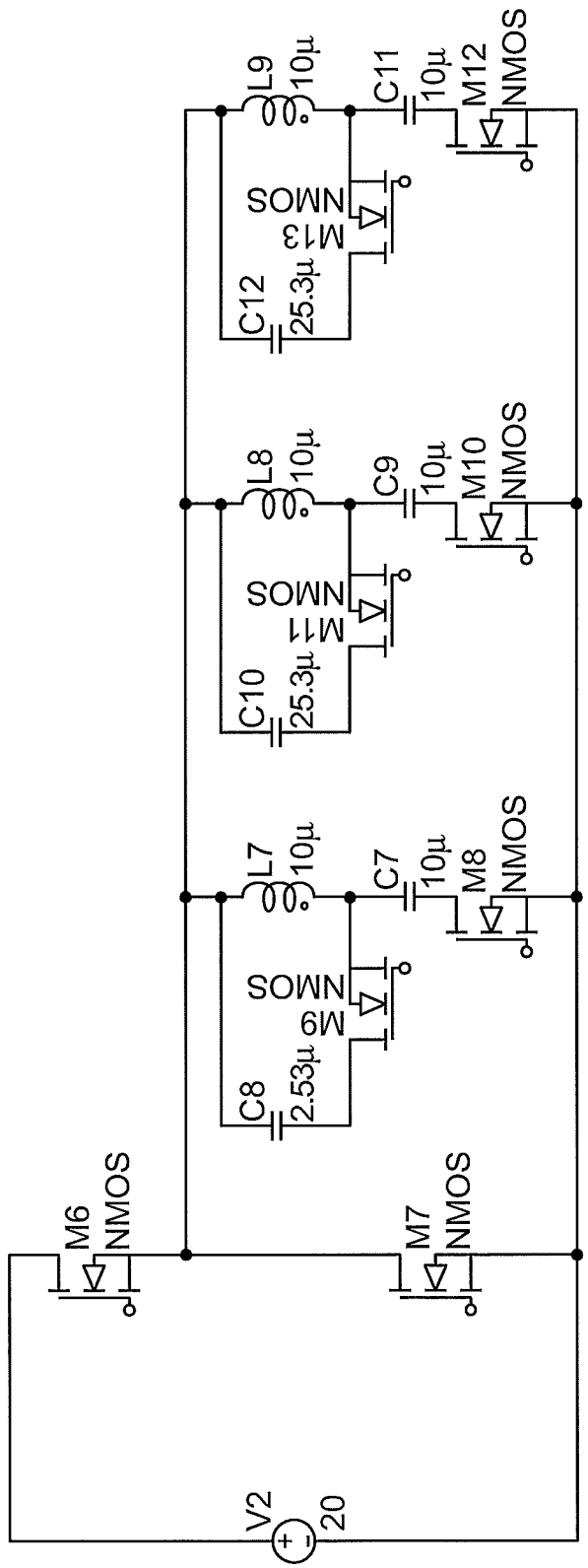
FIG. 7 is circuit diagram of one example of an inductive power transmitter circuit comprising three inductive power transmission coils.

FIG. 7 shows one example of an inductive power transmitter circuit comprising three inductive power transmission coils L7, L8 and L9 each having a resonant tank circuit. The values of capacitors C8, C10 and C12 of 25.3 uF and the values of inductors L7, L8 and L9 of 10 uF configure each resonant tank tuned to a frequency of 10 kHz. Capacitors C7, C9 and C11 are configured in to AC couple switches M8, M10 and M12. The inductor of the resonant tank incorporates a coil from the power transmitter. The IPT field is temporarily ceased while the OD field is generated by disconnecting switches M8, M10 and M12 and connecting switches M9, M11 and M13.

Where the IPT field is temporarily disabled while an FOD field is generated, the off time of the transmitter should be such that normal operation of the power receiver is not substantially affected. For example, avoidance of output voltage ripple or reinitializing of communications is preferable.

Figure 8:
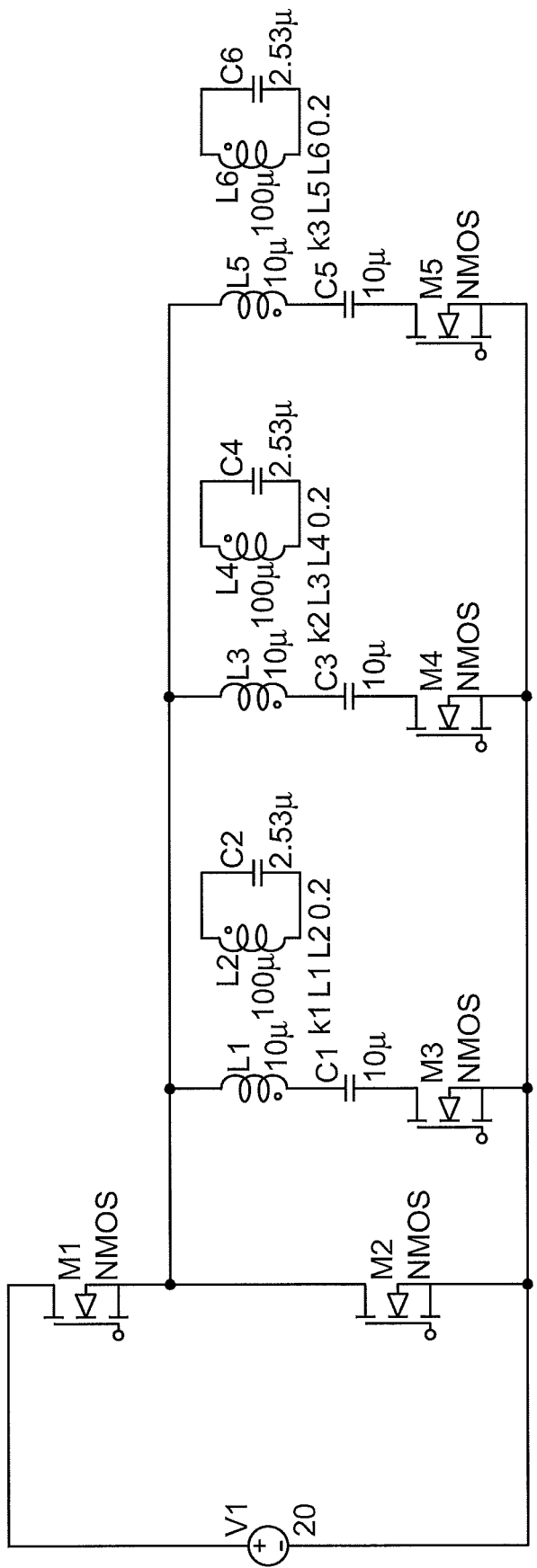
FIG. 8 is circuit diagram of another example of an inductive power transmitter circuit comprising three resonator tank circuits located separate but proximate to three inductive power transmission coils.

In other embodiments, the OD field can be superimposed upon the IPT field, both of which are generated by the power transmitter coil. Power transmission can advantageously be maintained constantly while the OD field is generated periodically. For example, FIG. 8 shows an inductive power transmitter circuit comprising three resonator tank circuits located separate but proximate to three inductive power transmission coils. Operation of the inductive power transmission coils L1, L3, L5 is temporarily stopped while each resonator tank circuit is operated when desired for object detection. Each of the power transmission inductor coils L1, L3 and L5 are driven by the inverter at 100 kHz. Each resonator tank comprising the combination of L2 C2, L4 C4 and L8 C8 is configured to resonate at 10 kHz so as to not have impact on the IPT field during operation of the OD field. When switches M3, M4 and M5 are opened, the residual energy in coils L2, L4 and L6 allow the circuit to resonate and act as the OD coil.

Figure 9A:
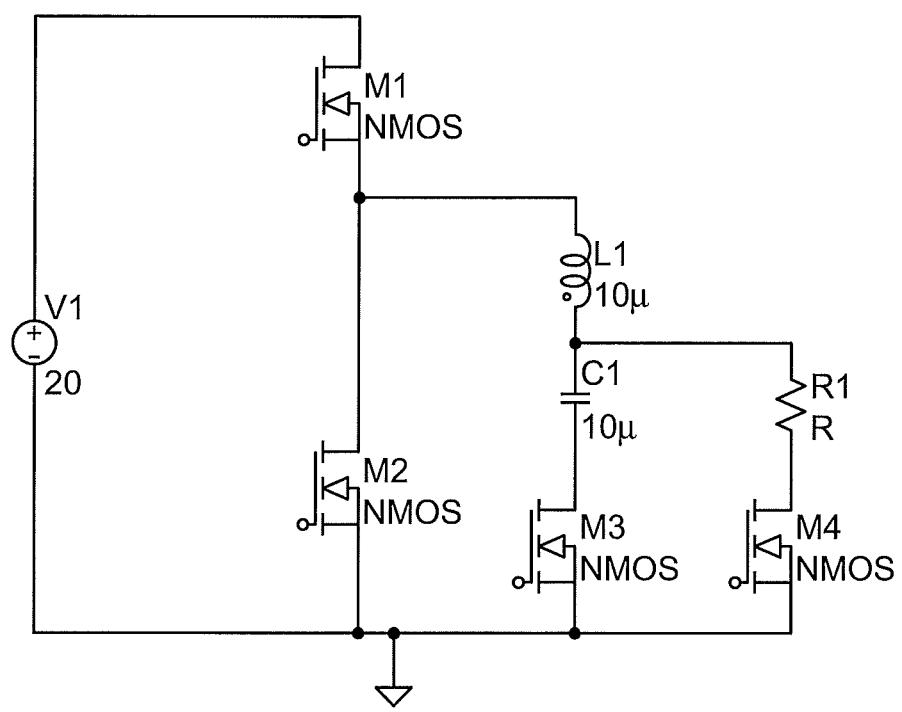
FIG. 9a is circuit diagram of another example of an inductive power transmitter circuit.
Figure 9B:
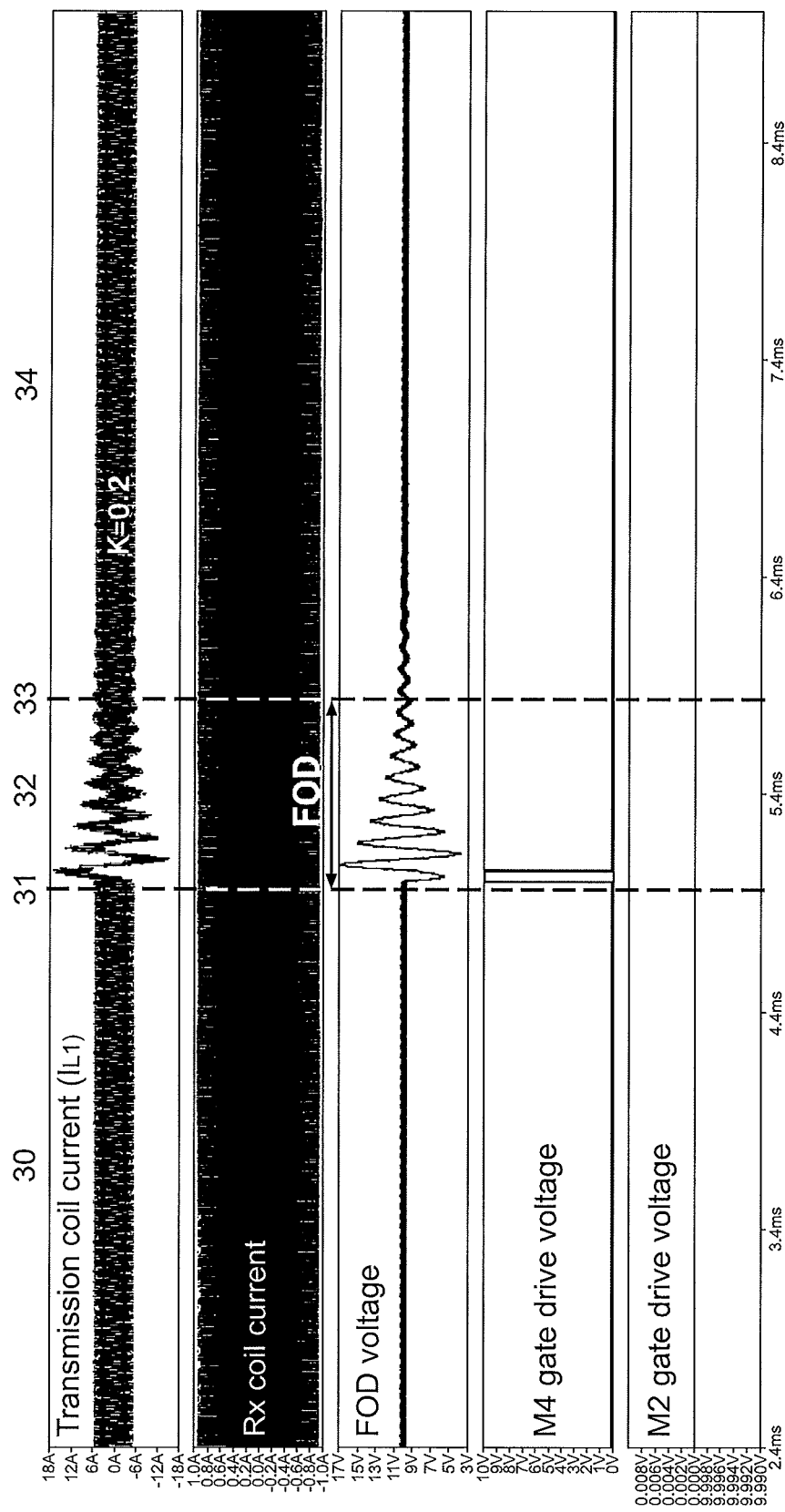
FIG. 9b is a graph of voltages during operation of a resonator circuit that is inductively coupled to a power transmission coil such as the example shown in FIG. 9(a).

FIG. 9(a) shows another example circuit where the IPT coil forms a part of the resonant tank by connection of a series capacitor C1 to the IPT coil L1. In this circuit, operation of the IPT field and OD field are able to occur simultaneously and the IPT field is superimposed with the OD field. FIG. 9(b) shows a graph of voltages during operation of such resonator circuit shown in FIG. 9(a). During time period 30, an IPT coil has a transmission coil current driven by an inverter (M1&M2) at a frequency of 100 kHz as shown. Capacitor C1 and switch M3 form an AC switch for amplitude control of the field in each coil. When this is used in combination with amplitude control over an array, the overall field direction in 3D may be controlled.

M4 is shorted for a period to control the peak value of the FOD decay envelope (the peak value is also determined by the value of R). Capacitor C1 has a value selected to resonate with L1 at 10 kHz. Switch M4 provides a compatible energy source to allow L1 and C1 to resonate for a short period.

At time 31, switch M4 is turned on for a short pulse (e.g. 50 us), this introduces a perturbation and causes the inverter resonant circuit to oscillate at its natural resonant frequency (given by the combination of L1 and C1). During time period 32, the OD field is superimposed upon the IPT field such that they operate simultaneously. The OD field is shown here to be of a lower frequency than the IPT field. At time point 33 the energy of the OD field has died away at a rate dependent upon the nature of objects within the field. During time period 34, normal operation of the inductive power transmission field continues. The current in a receiver device within the OD field is not affected because it is not tuned to the OD frequency. The switching voltage provided to switch M4 is shown to connect for a brief period at time 31 to thereby energise the resonator circuit.

In some embodiments, a source coil is configured to inductively energize a coil in a resonant tank circuit and that tank coil is responsible for generating large IPT field required to transfer sufficient power. This configuration is most suitable for low coupling (low k) applications such as large air gaps). The OD field is generated directly on the source coil and not coupled to it. Therefore in this case the source coil generates the OD field, the resonator coil generates the IPT field which is energized from the source coil. In other embodiments where there is no separate resonator coil and there only source coils, then both OD field and IPT field are generated on the source coils.

Figure 14A:
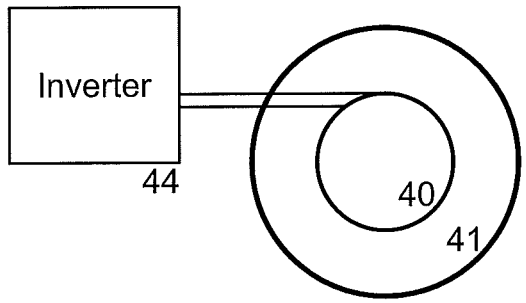
FIG. 14a is a top view of a source coil positioned within a concentrically arranged resonator coil.
Figure 14B:
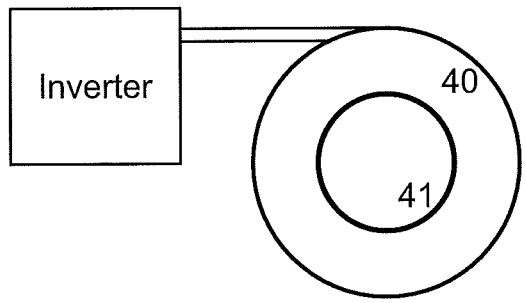
FIG. 14b shows a top view of an alternative arrangement having the resonator coil positioned within a concentrically arranged source coil.
Figure 14C:
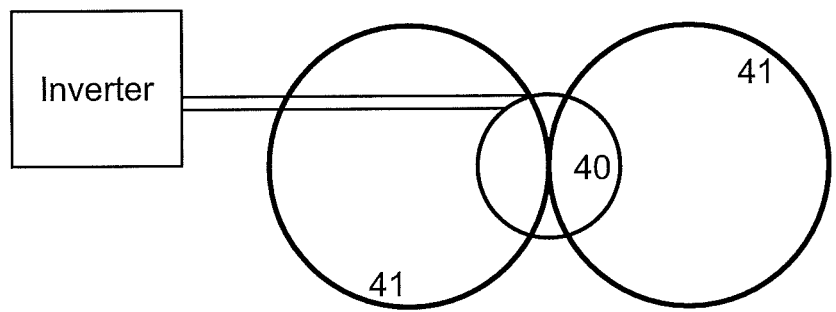
FIG. 14c shows a top view of a further alternative arrangement with a source coil positioned to overlap with two resonator coils.
Figure 14D:
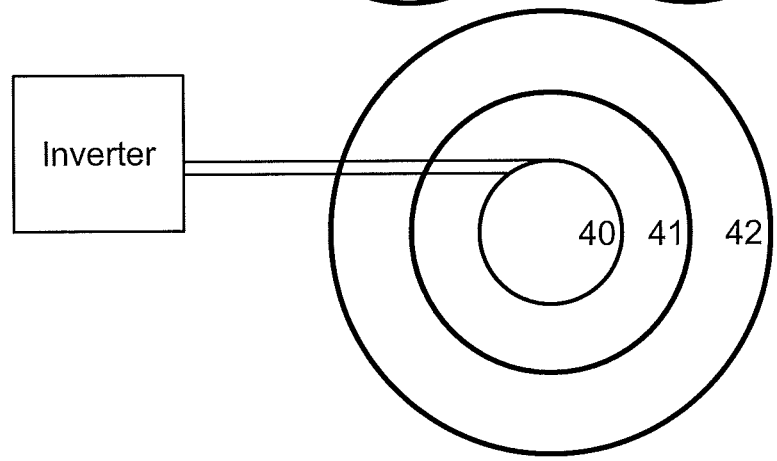
FIG. 14d shows a top view of a further alternative arrangement where an inner centric source coil is positioned within two outer concentric resonator coils in a cascaded configuration.

FIGS. 14(a)-(d) show 3D flat arrangements for the source coil and resonator coils configured for inductive coupling. For example, FIG. 14(a) shows a top view of a source coil 40 positioned within a concentrically arranged resonator coil 41. An inverter is configured to supply power to the source coil 40. FIG. 14(b) shows a top view of an alternative arrangement having the resonator coil 41 positioned within a concentrically arranged source coil 40. FIG. 14(c) shows a top view of a further alternative arrangement with a source coil 40 positioned to overlap with two resonator coils 41. This arrangement may advantageously allow a single source coil to drive multiple resonator coils. FIG. 14(d) shows a top view of a further alternative arrangement where an inner centric source coil 40 is positioned within two outer concentric resonator coils 41, 42 in a cascaded configuration.

In one exemplary embodiment, a resonator coil is loosely coupled to the source coil (k around 0.2). A resonator circuit is tuned to a frequency slightly lower than the operating frequency of the transmitter, for example the transmitter is tuned to operate at 110 kHz and the resonator is tuned to 100 kHz). At 110 kHz, the resonator appears like a inductor with a very small inductance. Therefore with a small current flowing in the source coil, a much larger current flows in the resonator coil. This means that the resonator coil provides most of the VA required to transfer power The coupling distance between the source coil and resonator coil K is not particularly critical and is chosen in conjunction with how much the resonator coil is compensated by the capacitor. For example, the coupling factor K could be 0.2.

This arrangement presents further advantageous since only a small VA is in the source coil, it can have a low natural Q without affecting the coupling efficiency too much. A PCB track can be used to implement the source coil thereby lowering manufacturing cost. The switches can be rated at much lower rating because they only need to switch much smaller VAs. The switching losses and conduction losses are lower. The reflected real load onto the source coil can be detected more easily since its VA is much smaller. The resonator circuit only consists of passive components thereby allowing easy adjustment of the increase the natural Q of the resonator coil. Further, when the receiver is close to the transmitter and the coupling condition is good, the likely presence of a ferrite will increase the inductance of coils which automatically reduces the total VA produced.

As mentioned above the resonant frequency of the resonant tank circuit 20 may be tuned to a frequency having significant separation from the frequency used for IPT to a receiver coil depending on the application requirements. Separation also potentially increases the sensitivity of physically small metallic objects nearby the transmitter due to the possibility of resonance being established in the object.

For example, the IPT frequency may be tuned to have an operating frequency within the range of about 110 kHz to about 205 kHz. Further, the resonant tank is tuned to have a resonant frequency is as high as in the MHz region, for example about 1 MHz, or in the low kHz region, such as about 5 kHz.

In some embodiments, the OD field is configured so that a range of OD field frequencies are used, using so-called frequency "hopping" or "sweeping". Several different frequencies may be used about the exemplary levels already described at which measurements for object detection are made. For example, OD field frequencies higher than the IPT field frequency measurements are taken at about 800 kHz, about 1 MHz and about 1.2 MHz, and for OD field frequencies lower than the IPT field frequency measurements may be taken at each of about 1 kHz, about 5 kHz and about 10 kHz.

Frequency hopping advantageously provides the ability to increase discrimination between foreign and friendly objects. For example, metal or ferrite may provide similar response to the OD field at a particular OD field frequency due to the selected OD field frequency being a harmonic of the IPT field frequency. However, such materials will provide a different response at different OD field frequencies whilst the response of non-resonant objects is substantially independent of frequency. Therefore the circuit is configurable to generate OD fields at various frequencies to enable detection and distinguishing of various materials within an OD field.

OD fields of different frequencies are created by altering the capacitive value of C1 in the resonant tank, shown as 2.53 microfarads, with a higher and/or lower capacitive value. Frequency hopping or sweeping is achieved by actively switching capacitive values in and out of the resonant tank by the use of semiconductor switching devices. In some embodiments, the controller 8 is configured to control operation of the switching devices and energise the resonant tank to thereby control generation of a set of OD fields at a range of frequencies.

Figure 10:
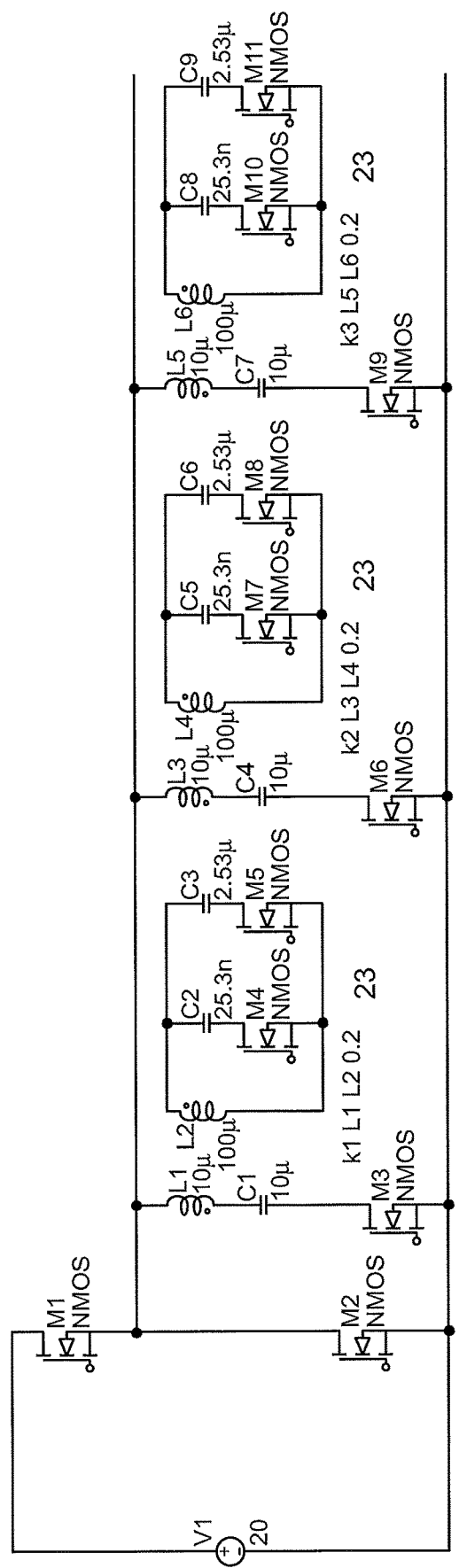
FIG. 10 is a schematic of an example circuit where multiple different frequencies may be generated.

FIG. 10 shows a schematic of an example circuit where multiple different frequencies may be generated to thereby provide, for example, IPT fields and OD fields, or OD fields of varying frequencies. In particular, FIG. 10 shows the resonant tank circuits 23 having a pair of capacitors able to be connected in parallel by switches. By controlling operation of the switches in the circuit, capacitors can be connected in parallel, or operated individually thereby changing the tuned frequency according to a relationship of $f=(LC)^{-0.5}$. For example, connection of switch M4 forms a circuit having an operation frequency of 100 kHz determined by the C2 capacitor value of 25.3 nF. Connection of switches M4 and M5 form a circuit having an operation frequency of 10 kHz determined by the C3 capacitor value of 2.52 uF. L2 can therefore be configured to resonate to produce an IPT field when configured to operate at one frequency, such as 100 kHz, and be further configured to operate at another frequency to generate a FO field, such as 10 kHz.

The IPT coils can be arranged in a rectangular array structure and may be linear (2D), overlapping or three dimensionally arranged. The coil and array can also be arranged to have a different geometrical or arbitrary shape.

Figure 11:
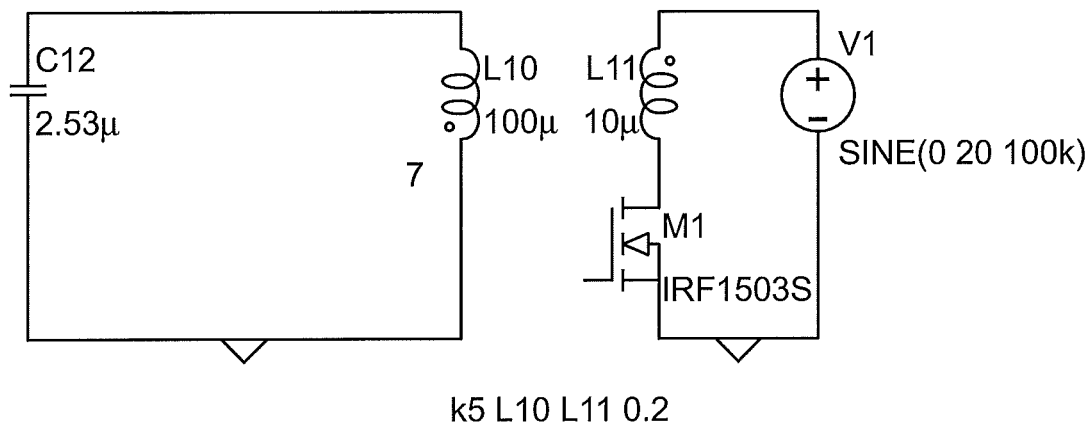
FIG. 11 is circuit diagram of energy inductively coupled to the coil L10 of the resonator circuit by another coil.
Figure 12:
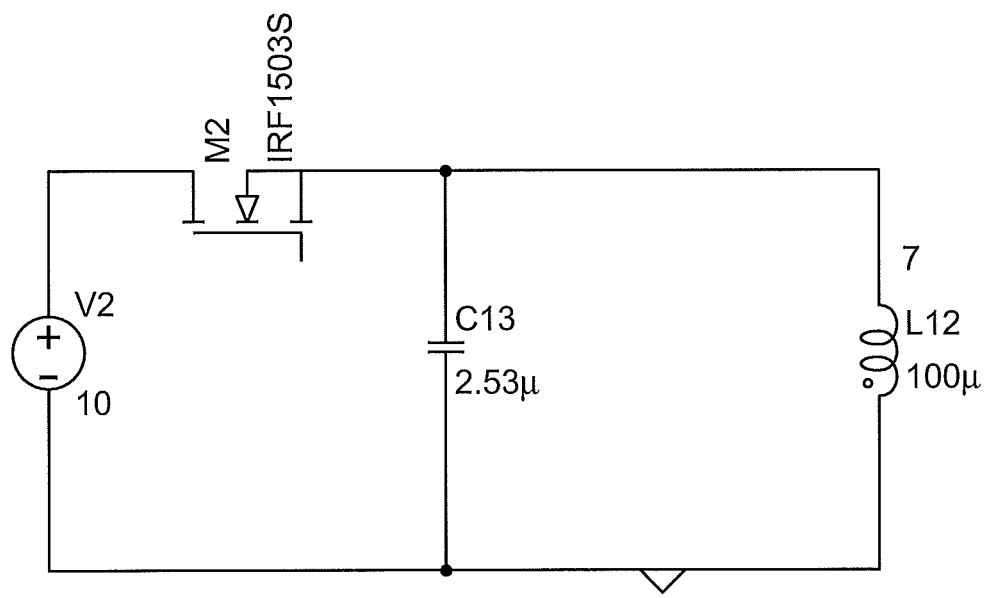
FIG. 12 is circuit diagram of energy coupled to the resonator by a switch M2 controlling coupling of energy from a DC source.

FIG. 11 and FIG. 12 show example embodiments configured to energise the resonator to thereby generate an OD field from a coil. In particular, FIG. 11 shows energy is coupled to the coil L1 of the resonator circuit inductively by another coil L11. Coil L11 is selectively energised by a solid state switch M1, for example, as an IRF1503 FET as shown. FIG. 12 shows energy coupled to the resonator by a switch M2 controlling coupling of energy from a DC source V2.

Absolute measurements are able to be taken from the OD field as it is decoupled from the IPT field. However, a FO will not be detected but will merely be part of the ambient environment if a FO is already present on the transmitter 'pad' at start-up. Therefore, in some embodiments, the controller 8 is configured to precalibrate the system. For example, a calibration token which is either physical, for example a metal disc, or digital, for example a calibration factor of known properties is used to calibrate the transmitter prior to use. By locating the token in particular locations and adjusting the algorithm output until the location and object type are correctly determined. In other embodiments, relative phase and amplitude measurements between the primary, excitation and detection coils are compared to relative expected values to determine whether there is anything unusual in the start-up environment. In some embodiments an alert is generated to manually check the environment or in other embodiments the output is used to adjust the algorithm.

In some embodiments, changes in the natural resonant frequency of the resonant tank circuit are detectable when any FOs are located within the object detection field. The reflected impedance from FOs and ferrite affects the resonant frequency of the resonant tank circuit. Therefore monitoring for changes in the resonant frequency of the tank circuit is indicative of a FO being present in the detection field. FOs such as metals reflect a capacitive and a resistive load back to the primary coil which is able to be detected by looking at the phase and amplitude of the induced voltage and/or current. One method of measuring the frequency is to sample the OD current in the source coil in a microcontroller. Changes in the resonant frequency are indicative of a change in the reflected impedance or change in inductance is, and based on that the nature of FOs can be predicted.

Measuring the resonant frequency may be simpler and requires minimal circuitry. However frequency measurement is most suitable for high k situations. In low k conditions the reflected impedance or effects of ferrites become too small to detect, and therefore relying on measuring frequency changes becomes unreliable under low k conditions. In addition the presence of both ferrite and metal together could cause a small overall change in resonant frequency, therefore making the detection method unreliable in certain cases. These shortcomings are overcome by the use of energy decay to indicate the presence of FOs as there is no dependency on k or placement of the objects.

Figure 13:
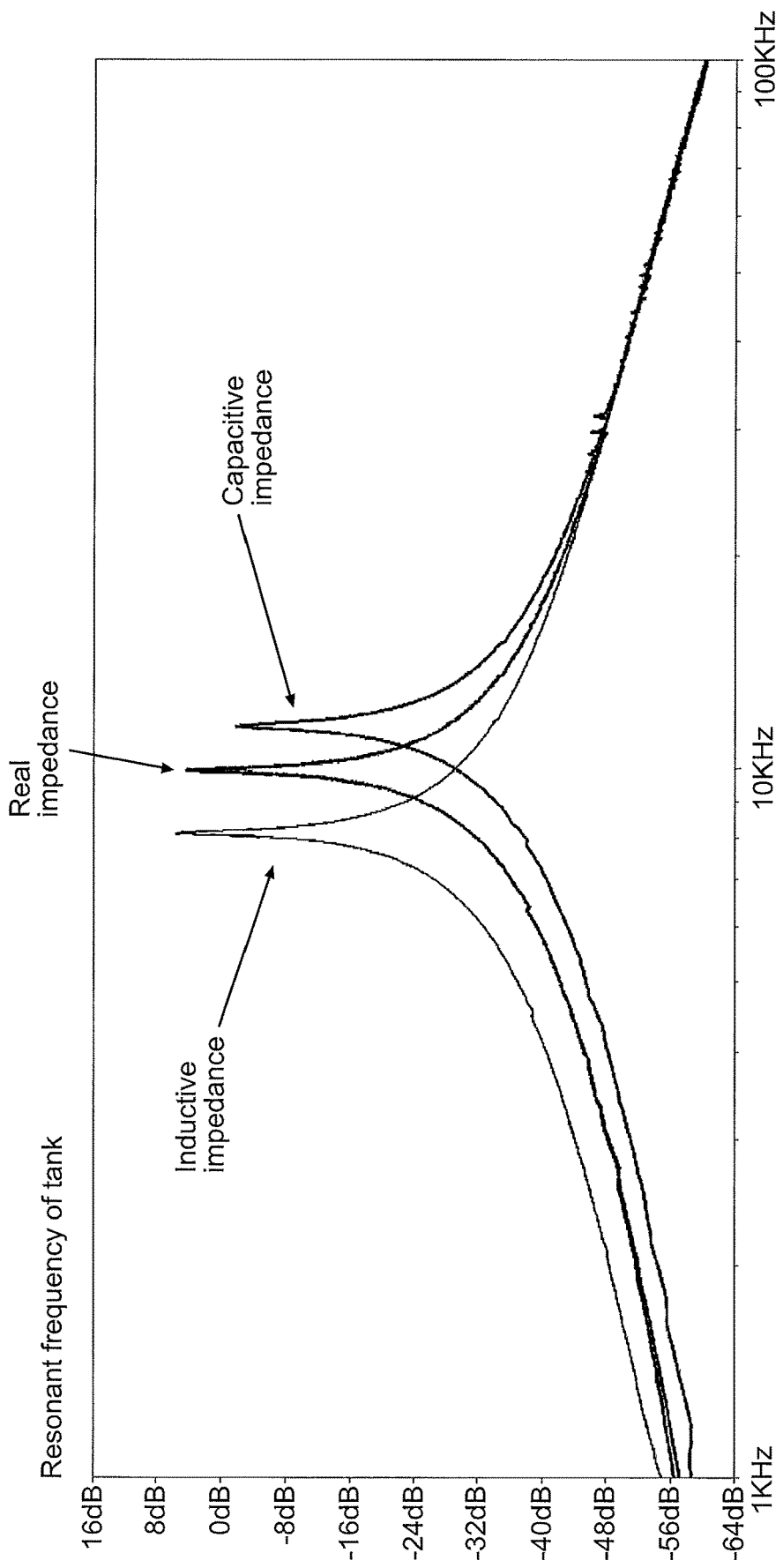
FIG. 13 is a graph of frequency response of a tank circuit as shown in FIG. 1.

FIG. 13 shows an example of a graph of frequency response of a tank circuit as shown in FIG. 1. In some embodiments, the controller 8 is configured to determine the resonance frequency of the resonant tank circuit, for example, by measuring the time period between one or more half wavelengths of the oscillating voltage such as zero crossings. In FIG. 6, the introduction of a reflected capacitive load has the effect of increasing the resonance frequency. Conversely, the presence of ferrites such as from a nearby IPT receiver has the effect of reducing the resonance frequency.

Therefore the use of a high Q resonant tank in conjunction with the coil of an IPT transmitter alone is able to be used to accurately measure power loss cause by FOs, and distinguish FOs from an IPT receiver. By measuring the rate of energy decrease in the tank, losses can be measured and attributed to FOs and IPT receivers. Further, losses due to an IPT receiver in proximity to the detection field are able to be avoided if the tank is tuned to a frequency very different from the IPT frequency. In such embodiments, measured losses are purely due to coil natural losses, which can be simply compensated for, and losses caused by FOs.

Further, when both a FO and a receiver are present together and they are both far away. Existing FOD methods cannot detect a FO because a low k means the reflected impedance is too small to detect. The proposed method only looks at power losses and does not depend on k. Therefore even if an FO is far away, as long as it induces power loss to the OD field, it can be detected as an increase in energy decay rate.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising: a resonant circuit including at least one power transmitting coil configured to generate an inductive power transfer (IPT) field; and an object detection (OD) system configured to detect the presence of an object based on a change in a rate of energy decay of the resonant circuit, wherein the OD system is configured to generate an OD field at a different frequency than the IPT field and wherein an initial level of energy in the resonant circuit is selected to determine a foreign object detection distance, wherein the object detection OD system is further configured to: provide the initial level of energy in the resonant circuit; determine an indication of the initial energy; determine an indication of a decayed energy in the resonant circuit after a predetermined time period; compare the indication of initial energy to the indication of decayed energy to provide a level of decay; and compare the level of decay against a one or more predetermined decays to determine a nature of any objects in the OD field.

2. The inductive power transmitter of claim 1, wherein the Q value is at least 10.

3. The inductive power transmitter of claim 1, wherein the resonant circuit is coupled to the transmitting coil and configured to superimpose the OD field onto the IPT field so that the two fields operate simultaneously.

4. The inductive power transmitter of claim 1, wherein the resonant circuit is configured to generate the OD field sequentially with the IPT field.

5. The inductive power transmitter of claim 1, wherein the change in energy decay is determined by comparison with energy decay indicative of the object not being present.

6. The inductive power transmitter of claim 1, wherein an increase in energy decay indicates a metal object in the OD field.

7. The inductive power transmitter of claim 1, wherein the frequency of the IPT field is between 110 kHz and 205 kHz.

8. The inductive power transmitter of claim 1, wherein the frequency of the OD field is between 5 kHz and 50 kHz or greater than 500 kHz.

9. The inductive power transmitter of claim 1, wherein the frequency of the OD field is at least a factor of 5 different from the frequency of the IPT field.

10. The inductive power transmitter of claim 1, wherein the resonant circuit includes a capacitor to tune the resonant circuit to the OD field frequency.

11. The inductive power transmitter of claim 10, wherein the capacitor is switchably couplable to the transmitting coil or a coil coupled to the transmitting coil.

12. An inductive power transmitter comprising: a resonant circuit including at least one power transmitting coil configured to generate an inductive power transfer (IPT) field; and an object detection (OD) system configured to detect the presence of an object based on a change in a rate of energy decay of the resonant circuit, wherein: the object detection OD system is configured to generate an object detection OD field at a different frequency than the IPT field, the resonant circuit is coupled to the transmitting coil and configured to superimpose the object detection OD field onto the IPT field so that the two fields operate simultaneously, and an initial level of energy in the resonant circuit is selected to determine a foreign object detection distance, wherein the object detection OD system is further configured to: provide the initial level of energy in the resonant circuit; determine an indication of the initial energy; determine an indication of a decayed energy in the resonant circuit after a predetermined time period; compare the indication of initial energy to the indication of decayed energy to provide a level of decay; and compare the level of decay against a one or more predetermined decays to determine a nature of any objects in the OD field.

13. The inductive power transmitter of claim 12, wherein the frequency of the IPT field is between 110 kHz and 205 kHz.

14. The inductive power transmitter of claim 12, wherein the frequency of the OD field is between 5 kHz and 50 kHz or greater than 500 kHz.

15. The inductive power transmitter of claim 12, wherein the frequency of the OD field is at least a factor of 5 different from the frequency of the IPT field.

16. The inductive power transmitter of claim 12, wherein the resonant circuit includes a capacitor to tune the resonant circuit to the OD field frequency.

17. The inductive power transmitter of claim 16, wherein the capacitor is switchably couplable to the transmitting coil or a coil coupled to the transmitting coil.

* * * * *